Nov. 3, 1964 L. T. FIKE 3,154,814
TIRE CURING APPARATUS
Filed April 30, 1963 5 Sheets-Sheet 1
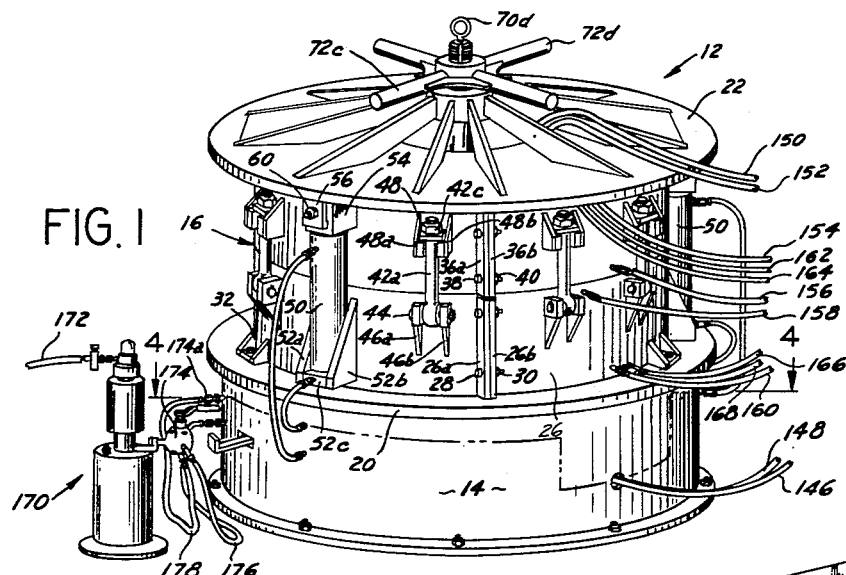
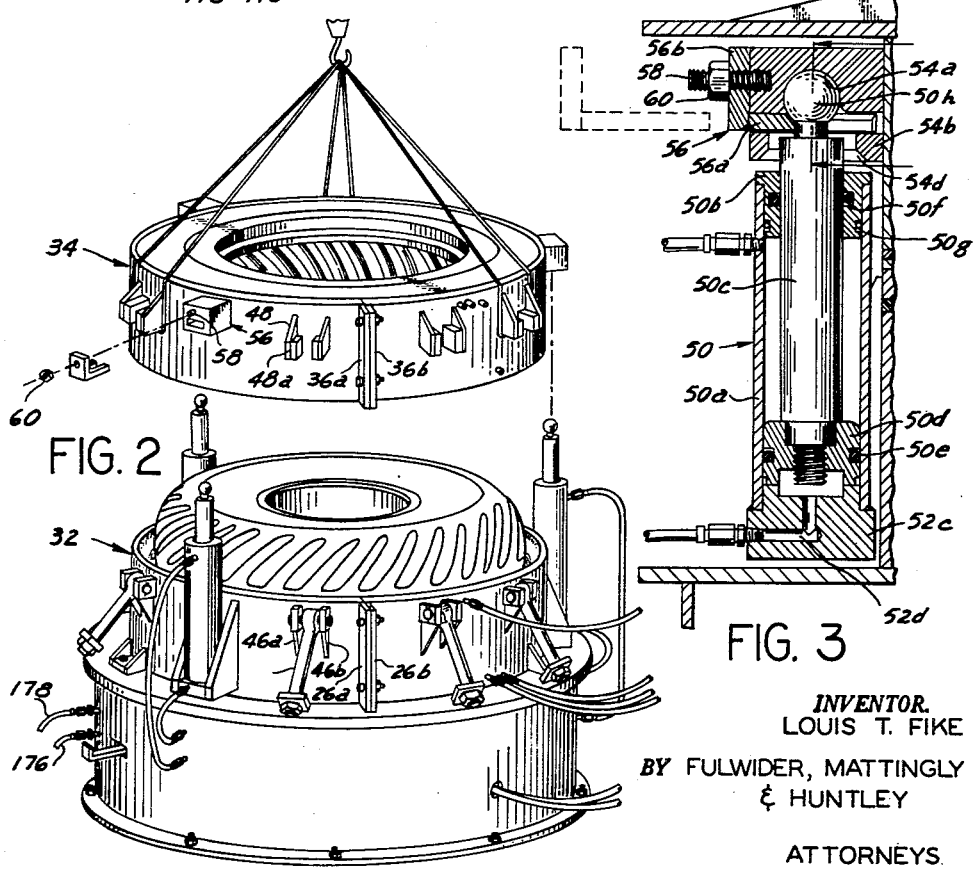
INVENTOR.
LOUIS T. FIKE
BY FULWIDER, MATTINGLY
& HUNTLEY
ATTORNEYS.

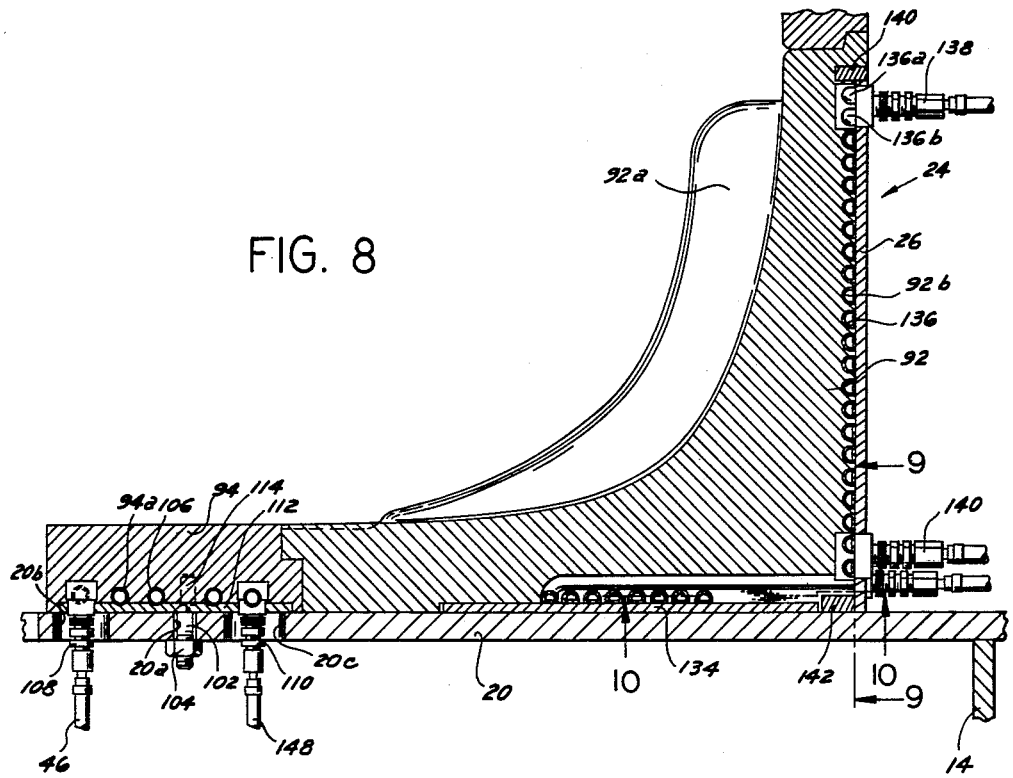

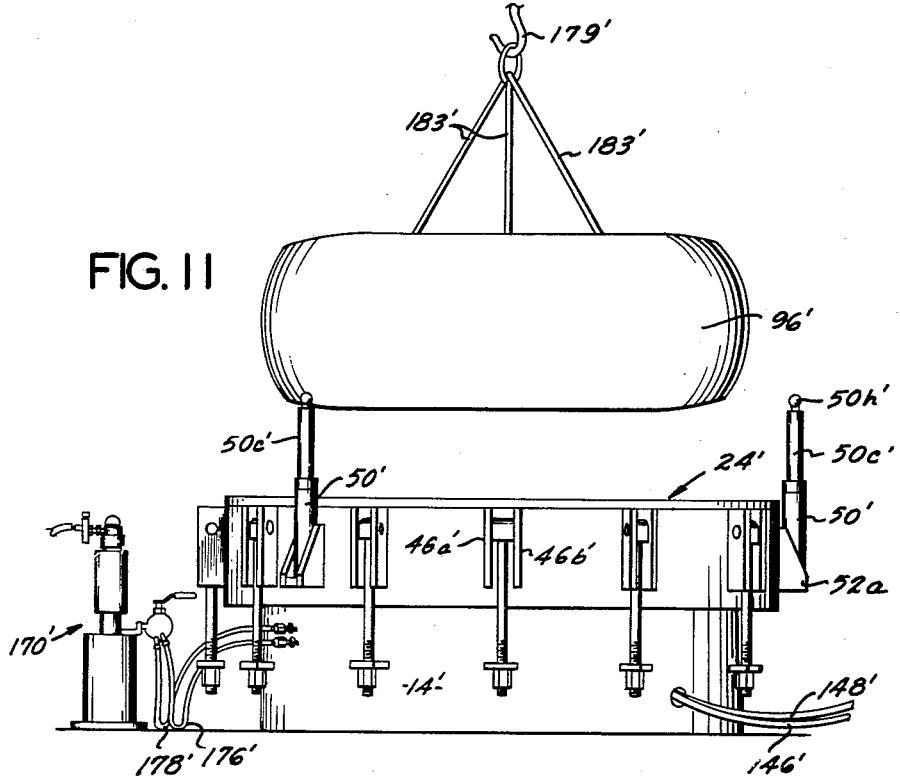
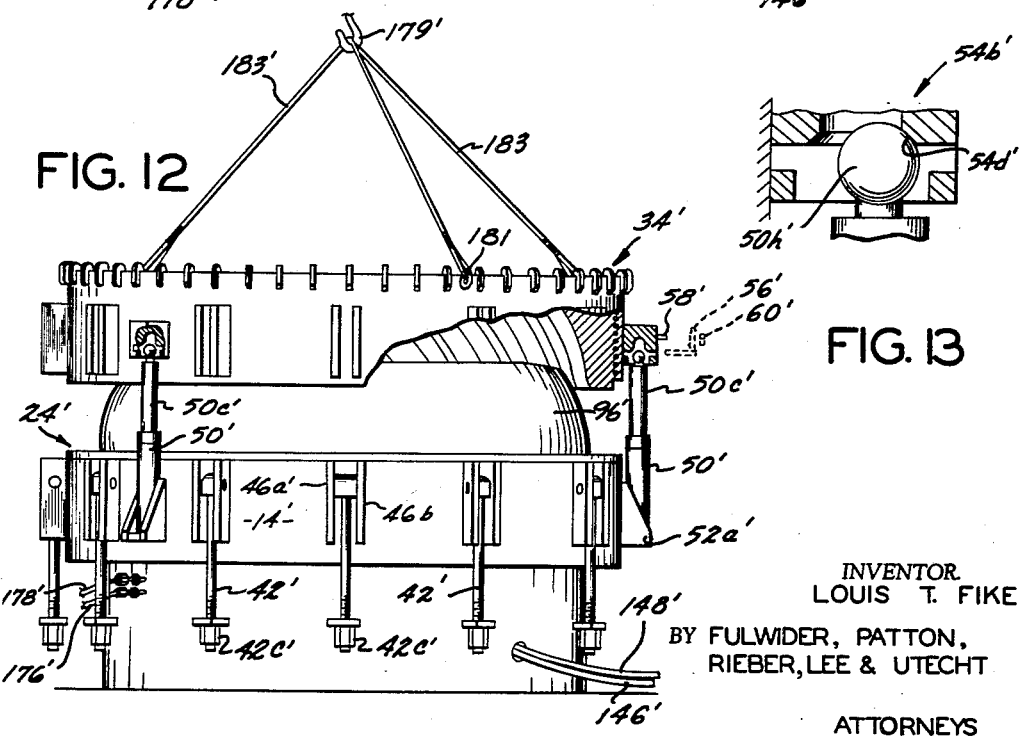

United States Patent Office 3,154,814
Patented Nov. 3, 1964

3,154,814
TIRE CURING APPARATUS
Louis T. Fike, Lodi, Calif., assignor to Super Mold Corporation of California, Lodi, Calif., a corporation of California
Filed Apr. 30, 1963, Ser. No. 277,420
10 Claims. (Cl. 18—18)

This is a continuation-in-part of my patent application Serial No. 84,447, filed January 23, 1961, and now abandoned.

The present invention relates generally to tire curing apparatus and more particularly to apparatus of this nature adapted to mold a tread onto a tire casing.

It is a major object of the present invention to provide apparatus particularly adapted for retreading relatively large off-the-road tires such as used on heavy trucks and earth moving equipment. Previous devices of this type have been heavy, expensive and cumbersome employing mold sections that support a matrix, with force-applying means being interposed between the mold sections to effect separation thereof. The apparatus of the present invention eliminates the mold sections and substitutes therefor upper and lower matrices, with force-applying means being interposed directly between the matrices for effecting the vertical separation thereof. This construction permits a substantial reduction in cost of manufacture and also more efficient operation during a matrix separating step.

Another object of the present invention is to provide tire curing apparatus of the aforedescribed nature provided with simple yet rugged means for firmly securing together the upper and lower matrices during a tire curing operation, with such means being readily disengageable at the conclusion of a tire curing operation.

It is another important object of the present invention to provide tire curing apparatus utilizing a lower matrix provided with vertically extending fluid pressure-operated jacks each having a cylinder secured directly to the lower matrix and a vertical shaft reciprocally extending from the upper end of each cylinder, universal joint means interposed between the upper portion of each of the shafts and the upper matrix to permit universal pivoting of the upper matrix relative to the shafts, but restraining lateral movement of the upper matrix relative to the shafts, and with the universal joint connection means being quick-releasable from the upper matrix by lock means operatively associated with the connection means. When the lock means are engaged the shafts will effect vertical movement of the upper matrix with the upper matrix however being free to pivot universally relative to the shafts.

It is another object of the present invention to provide tire curing apparatus which separates the tread material of a cured tire from the upper matrix with minimum danger of damaging such tread material.

It is yet a further object of the present invention to provide tire curing apparatus permitting a maximum rate of production at minimum cost.

These and other objects and advantages of the present invention will become apparent from the following detailed description, when taken in conjunction with the appended drawings wherein:

FIGURE 1 is a perspective view of a first form of curing apparatus embodying the present invention shown in its closed or operating position;

FIGURE 2 is a view similar to that of FIGURE 1, but showing the apparatus open and the upper matrix removed from the lower matrix;

FIGURE 3 is an enlarged vertical sectional view taken substantially along the center line of one of the hydraulic jacks of said apparatus;

FIGURE 8 is an enlarged vertical sectional view of one-half of the lower matrix of the mold;

FIGURE 9 is an enlarged sectional view taken substantially along line 9—9 of FIGURE 8;

FIGURE 10 is an enlarged sectional view taken substantially along line 10—10 of FIGURE 8;

FIGURE 11 is a side elevational view showing a second form of tire curing apparatus embodying the present invention, with a tire to be cured being shown lowered into the lower matrix thereof prior to a curing operation;

FIGURE 12 is a view similar to FIGURE 11 showing the upper matrix being lowered onto said lower matrix;

FIGURE 13 is a fragmentary vertical sectional view showing a detail of the apparatus of FIGURES 11 and 12;

Like reference figures indicate corresponding parts throughout the several views of the drawings.

Figure 4:
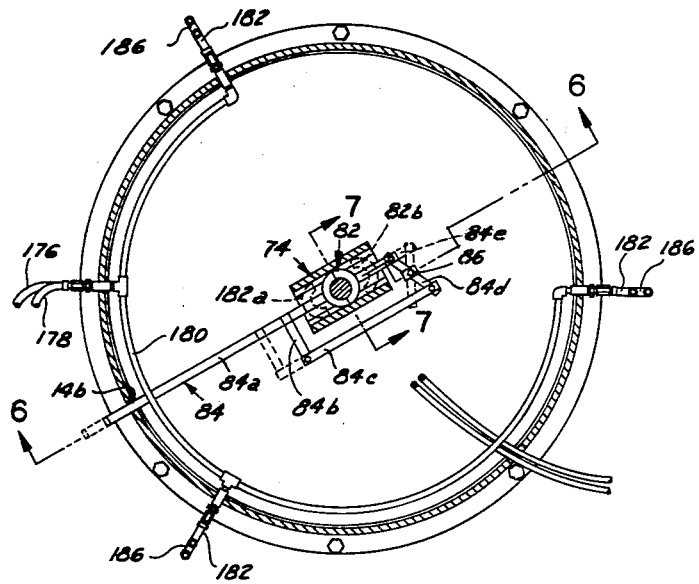
FIGURE 4 is a sectional view taken substantially along line 4—4 of FIGURE 1.
Figure 5:
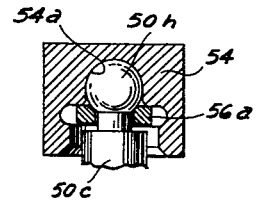
FIGURE 5 is an enlarged sectional view taken substantially along line 5—5 of FIGURE 3.

Referring to FIGURE 1 of the drawings wherein is shown a preferred embodiment of the present invention, there is shown a first form of curing apparatus 12 embodying the present invention and comprising a stand 14 whereon is positioned a molding section 16. Stand 14 is formed of sheet steel having a cylindrical shape and provided with an annular flange 14a having suitable openings whereby the entire stand may be fastened to the floor or other mounting platform by means of studs and nuts therefor as shown at 18.

The molding section 16 of the curing apparatus comprises a pair of similarly constructed platens 20 and 22 which are annular in shape in that each is provided with a central opening. The lower platen 20 rests on the upper edge of curing stand 14.

Mounted on the upper surface of platen 20 is a lower matrix assembly 24 which is part of molding section 16. As shown in FIGURE 1, lower matrix assembly 24 comprises a sheet steel outer shell or casing 26 which is cylindrical in shape and formed with a pair of opposed flanges 26a and 26b which can be drawn together by means of bolts 28 and nuts 30 for a purpose to be hereinafter more fully explained. The lower matrix assembly 24 is fastened to platen 20 by means of a plurality of flange members 32, each of which comprises a pair of bracket members 32a and 32b and a horizontal member 32c wherein is provided a through opening 32d. Each of the flange assemblies 32 is welded together as assembled and is welded to the other shell or casing 26 of matrix assembly 24 in spaced relation thereabout.

Removably mounted on top of the lower matrix assembly 24 is an upper matrix assembly 34 which is also formed with a sheet steel outer shell 36 having a pair of opposed flanges 36a and 36b which can be drawn together by means of bolts 38 and nuts 40.

Continuing to refer to FIGURE 1 of the drawings, there is shown a plurality of fastening devices 42 each of which comprises a swing bolt 42a, one end of which is provided with a through opening for pivotal mounting thereof on the lower matrix assembly 24 as by means of a pin 44 which is attached to a pair of bracket members 46a and 46b, the latter of which are welded to the outer shell 26 of lower matrix assembly 24. The other end of swing bolt 24a is formed with fastening threads for receiving a nut 42c and fits within a bracket member 48 fastened to the outer shell 36 of the upper matrix assembly 34, each of said bracket members 48 comprising a pair of oppositely disposed extending members 48a and 48b.

By virtue of the above described construction, it is possible to firmly secure together the upper and lower matrix assemblies by means of positioning the swing bolts 24a as shown in FIGURE 1 and fastening the nuts 42c tightly against the bracket 48. The swing bolts and their cooperating parts therefor serve as quick-releasable securing means between the upper and lower matrices.

To assist in opening and closing mold 16 while the bolts 42a of fastening devices 42 are removed from bracket members 48 and are positioned as shown in FIGURE 2, there is provided three like hydraulic jack assemblies 50 equally spaced about the periphery of mold section 16. Each of the hydraulic jacks 50 is fixed at its lower end to the outer shell 26 of matrix assembly 24 and at its upper end to outer shell 36 of upper matrix 34. Fastened to outer shell 26 are three like bracket assemblies each comprising a pair of oppositely disposed vertically extending plate members 52a and 52b joined together by a horizontal fitting-mounting plate member 52c, each entire bracket assembly 52 being welded to said outer shell 26.

Referring to FIGURE 3 of the drawings, the fitting-mounting member 52c is formed with a through opening 52d whereby fluid, such as oil, under pressure can be brought into the hydraulic jack 50. The latter device comprises a vertical cylinder 50a which is fixed to fitting-mounting member 52c and which is provided with a head 50b formed with a central through opening for slidably receiving a coaxial shaft 50c. The lower end of shaft 50c is formed with threads for receiving a piston 50d the underside of which is exposed to the hydraulic fluid entering through opening 52d in fitting-mounting member 52c. Piston 50d is formed with an annular cutout or groove 50e for receiving an O-ring that prevents fluid flow between piston 50d and cylinder member 50a. Head member 50b of hydraulic jack 50 is formed with an inner arcuate groove 50f and an outer arcuate groove 50g, each of such grooves being provided with an O-ring for sealing the interior of cylinder 50a from the outer atmosphere.

The upper or free end of shaft 50c is formed with a sphere 50h which is received within a complementary socket 54a formed in a mounting bracket 54, the latter being welded to the outer casing 36 of upper matrix assembly 34. The lower portion 54b of bracket 54 is provided with a through opening 54c having a very prominent taper or chamfer at its lower end as shown at 54d. As will hereinafter become more apparent, this configuration aids in bringing the upper matrix assembly 34 into proper alignment with lower matrix assembly 24. A horizontal slot 54e is formed in mounting bracket 54 between and contiguous with socket 54a and opening 54c.

Once the sphere 50h of a shaft 50c is positioned properly within socket 54a of bracket 54, an L-shaped retainer 56 formed of two pieces of steel 56a and 56b welded together at right angles, is inserted into slot 54c. The horizontal element 56a of retainer 56 is bifurcated to provide a pair of parallel arms which are positioned on opposite sides of the lower end portion of sphere 50h when the bracket 56 is fastened to mounting bracket 54 by means of stud 58 and nut 60 which extend through an opening in element 56b of retainer 56. The three retainers 56 cooperate with the three mounting brackets 54 to provide a quick-releasable lock means between the upper matrix and the upper ends of the shafts 50c.

The arms of the bifurcated member 56a of bracket 56 are formed with beveled or tapered upper-inner edges to more nearly conform to the shape of the sphere 50h of shaft 50c when assembled as shown in FIGURE 3.

Figure 6:
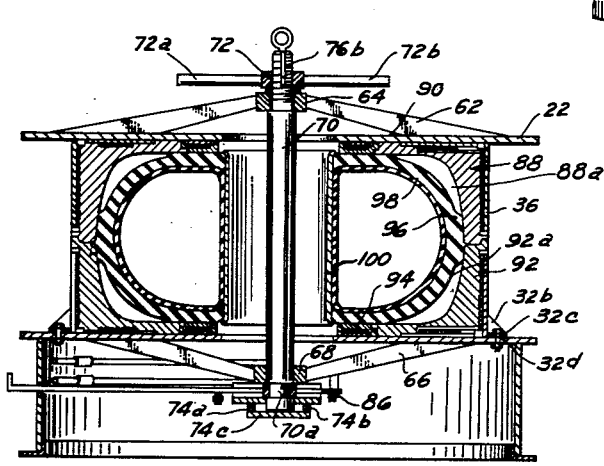
FIGURE 6 is a vertical sectional view taken substantially along line 6—6 of FIGURE 4.

The upper platen 32 rests on the upper matrix assembly 24, as shown in FIGURES 1 and 6. It will be noted from the latter figure that the platens 20 and 22 are of substantially identical construction and are positioned at opposite ends of the molding section 16 of the curing apparatus 12.

The upper platen 22 is provided with a plurality of gusset members 62 which are equally spaced about platen 22 and are fastened thereto as by welding or the like, such gussets 62 extending radially from a centrally located hub 64. Gusset members 62 are also welded to hub 64 to thereby provide a unitary assembly consisting of hub 64 and the plurality of gusset members 62 fastened to platen 22.

As will be noted from FIGURE 6 of the drawings, a similar construction is provided with respect to lower platen 20 in that it is provided with a plurality of radially extending gusset members 66 which are welded to the undersurface of platen 20 and to a centrally located hub 68.

Each of the hubs 64 and 68 is provided with a central through opening through which extends a center post or shaft 70 formed with an annular groove or cutout 70a at its lower end portion and provided with fastening threads 70b at its upper end. The arcuate groove in the lower portion of center post 70 is for receipt of the opposite halves of a split ring fastening structure which will hereinafter be described in detail. Suffice for the time being that the opposite halves of the split ring fit within the annular groove 70a but extend beyond the outer surface of center post 70 so as to abut against or interfere with the undersurface of hub 68. In this manner, it is seen that once center post 70 has been extended downwardly through the opening in hub 68 and the split ring locking member has been positioned within the annular groove 70a therein, upward movement of center post 70 is prevented.

The threaded upper end 70b of center post 70 extends through the central opening of hub 64, and a locking nut 72 provided with oppositely disposed handle members 72a, 72b, 72c and 72d is threaded onto end 70b. It is thus seen that the lower end portion of center post 70 is prevented from traveling upwardly through hub 68, by means of the split ring locking means, so that tightening of fastening nut 72 on threaded end portion 70b causes the platens 20 and 22 to be firmly urged or forced toward each other. In this manner, the matrix assemblies 24 and 34 of molding section 16 are firmly held together. As will be noted in FIGURE 6 of the drawings, end portion 70b of center post 70 is reduced in diameter so as to provide a shoulder 70c which is incapable of passing through the center opening of hub member 64. Center post 70 is further provided with a hook 70d at its upper end to facilitate removal of plate 22 as will be hereinafter explained.

Figure 7:
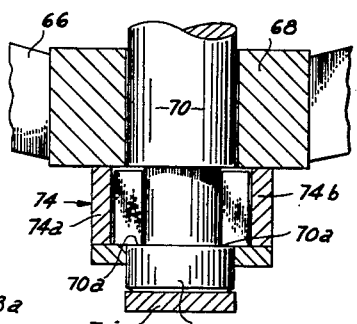
FIGURE 7 is an enlarged fragmentary sectional view taken substantially along line 7—7 of FIGURE 4.

As shown most clearly in FIGURES 4, 6 and 7, the split ring locking mechanism for the lower portion of center post 70 comprises a U-shaped bracket 74 having a pair of vertical members 74a and 74b welded or fastened by any other appropriate means to the underside of hub 68 and to a horizontal member 74c, the latter of which is formed with an opening through which extends the bottom portion 70e of center post 70. To properly position center post 70 so that the annular groove 70a thereof will receive the two halves of the split ring, there is provided a ledge or stop member 76 which is fixed to horizontal member 74c of bracket 74. By virtue of this arrangement, travel of center post 70 through the opening in hub 68 is limited so that the annular groove 70a in the lower end portion thereof is aligned with the internal space provided by U-shaped bracket 74.

Positioned within bracket 74 for sliding movement with respect thereto are the two halves 82a and 82b of a split ring washer or fastening device 82. Such members 82a and 82b are movable to and from their locked positions as shown in solid lines in FIGURE 4 and their unlocked positions as shown therein with broken lines. To effectuate such movement, there is provided a foot or hand operated lever mechanism 84 comprising a lever 84a fastened to the half 82a of split ring 82 and extending through an opening 14b in curing stand 14. Lever mechanism 84 further comprises a lever 84b, one end of which is firmly fastened to lever 84a while the other end thereof is pivotally attached to a lever 84c. The latter member is also pivotally fixed to a rocker arm 84d which in turn is fastened to a lever 84e which is fixed directly to the half 82b of the split ring 82. Rocker arm 84d is pivotally mounted, as by means of pin 86, on one of the gussets 66 which is fixed to platen 20. With this arrangement, as shown by dotted lines in FIGURE 4, it is possible for the operator of the curing apparatus to move the lever 84a so as to retract the half 82a of split ring 82 from its locked position within the annular groove 70a of center post 70. Such movement of lever 84a also causes rocker arm 84d to pivot about pin 86 in a clockwise direction as viewed in FIGURE 4 so as to also retract the half 82b of ring 82 from within groove 70a. In reverse manner, inward movement of lever 84a moves both of the halves 82a and 82b into their locked positions with respect to center post 70, the half 82b of ring 82 being moved into its locked position by virtue of counterclockwise movement of rocker arm 84d as viewed in FIGURE 4.

Making further reference to FIGURE 6 of the drawings, it will be noted that within the outer shell 36 of the upper matrix assembly 34 is an annular matrix 88 formed with suitable grooves and ribs as at 88a which define the tread configuration of half of the tire being cured within the mold portion of the curing apparatus 12. Also part of the upper matrix assembly is a pressure plate 90 which has as one of its main purposes the curing of defects such as radial cracks or other blemishes in the side walls of the tire.

In similar fashion, the lower matrix assembly 24 comprises within its outer shell 26, a matrix 92 having tread configurations 92a which match those of upper matrix 88, and a pressure plate 94 which is annular in shape and used for the same purpose ascribed above to pressure plate 90.

Shown positioned within the matrices of FIGURE 6 is a tire 96 which together with an inner tube 98 is mounted on a rim 100. The tire 96 includes a casing and tread material to be bonded thereto.

Referring now to FIGURE 8 of the drawings, there is shown a portion of the lower matrix 92 positioned on the lower platen 20 and abutting against the outer periphery surface of annular pressure plate 94. The latter is rigidly fixed to platen 20 by means of a stud 102 which is threaded into an appropriate opening in pressure plate 94 and extends through an opening 20a formed in platen 20. A nut 104 threadedly cooperates with stud 102 to retain pressure plate 94 in a given position with respect to platen 20.

Before pressure plate 94 is fastened to platen 20, however, it is formed with convoluted grooves 94a wherein copper tubing 106 is positioned, there being fittings 108 and 110 affixed to the opposite ends of tubing 106 to facilitate transmission of heated fluid through such tubing. After tubing 106 has been positioned in the grooves 94a, an annular plate 112 is firmly fastened to pressure plate 94 by means of a plurality of appropriately spaced screws 114 which threadedly engage pressure plate 94. Plate 112 is formed with suitable openings to accommodate fittings 108 and 110, such fittings also extending through openings 20b and 20c of platen 20.

Preferably, the grooves 94a of pressure plate 94 are of sufficient width to receive the copper tubing 106 but of insufficient depth to completely accommodate the height of such tubing. Thus, with a predetermined portion of tubing 106 exposed beyond the surface of pressure plate 94, when plate 112 is firmly fastened against pressure plate 94, the copper tubing 106 is deformed by being forced to conform to the shape or configuration of such groove 94, whereby it is held in firmly heat transfer relation with pressure plate 94. In this manner, when heated fluid is passed through tubing 106, it readily heats pressure plate 94 by means of conduction through the copper wall of tubing 106.

Matrix 92 is also formed with a series of convoluting grooves 116 in the undersurface thereof as shown in detail in FIGURE 10. A groove 116a is provided from the outermost convolution to the outer peripheral surface of matrix 92 at substantially the same depth as grooves 116. Connecting the innermost convolution with the outer periphery of matrix 92, is a groove 116b which is approximately twice the depth of the grooves 116.

Copper tubing 118 is positioned within the grooves 116, there being sections of tubing 120 and 122 which connect the opposite ends of tubing 118 to suitable fittings 124 and 126, respectively. It should be noted at this juncture that the section of tubing 122 extends above the convolutions of tubing 118, as shown in FIGURE 8, and that suitable elbows are employed as shown at 128, to effect connection between the sections 120 and 122 and the tubing 118.

As shown in FIGURE 10, the convolutions 118 are provided with several bends as shown at 130 and 132 in accordance with the grooves 116 to effect the proper distribution of heat throughout the matrix 92 as will hereinafter become more apparent. As above explained with respect to tubing 106 of pressure plate 94, the tubing 118 of matrix 92 is also held in firm contact with the side walls of the grooves 116 by means of an annular plate 134, the latter being forced against the tubing 118 when the matrix assembly 24 is firmly fastened to the lower platen 20.

The outer cylindrical surface of matrix 92 is also provided with a series of parallel grooves 92b of such size as to receive copper tubing 136 so that when outer shell or casing 26 is firmly wrapped around matrix 92, as by drawing together fastening nut 28 and bolt 30, such tubing 136 is pressed into firm engagement with matrix 92 for effecting optimum heat transfer therebetween. It has been found most desirable to arrange copper tubing 136 in several parallel circuits whereby an inlet fitting 138 causes heated fluid to be transmitted simultaneously through two separate circuits to an outlet fitting 139. Suitable openings are formed in shell 26 to accommodate fittings 124, 126, 138 and 139.

To prevent shell 26 from moving relative to matrix 92, there is provided several steel bands 140 and 142 welded respectively to the upper and lower edges of casing 26. Such bands fit within suitable annular grooves formed in matrix 92 whereby the casing 26 is prevented from sliding over the matrix 92.

As shown perhaps most clearly in FIGURE 6 of the drawings, the upper matrix 88 of mold section 16 is provided with the same type of heating conduits as above explained with respect to matrix 92.

It is contemplated within the scope of the present invention that the aforedescribed heating tubes be arranged in any desired pattern in accordance with the particular requirements concerning distribution of heat throughout the matrices.

As shown most clearly in FIGURE 1, to transmit heated fluid from a source thereof (not shown) to the various sections of copper tubing imbeded in the matrices and pressure plates, there is provided appropriate flexible conduits such as shown at 146 and 148 which extend through a suitable opening in the side wall of curing stand 14 for connection with the quick-disconnect fittings 108 and 110. In like fashion, a pair of conduits 150 and 152 are provided for effectivley connecting such source to the tubing imbeded in upper pressure plate 90. Conduits 154 and 156 are connected respectively to the inlet and outlet fittings of the copper tubing imbeded in the cylindrical outer peripheral wall of matrix 88 while conduits 158 and 160 communicate with the tubing in the outer wall of matrix 92. Conduits 162 and 164 effect connection of the copper tubing in the upper wall of matrix 88 to the source of heated fluid such as steam, while the corresponding copper tubing 118 in the lower matrix 92 is connected to such source by means of conduits 166 and 168. It should be noted that heating means other than the tubing could be utilized, as for example, electric heating elements.

Making further reference to FIGURE 1 of the drawings, there is shown therein a hydraulic pump 170 which is connected to a source of air pressure (not shown) by means of conduit 172. Pump 170 is intended to illustrate an air-to-oil pump whereby one pound of air pressure creates forty pounds of hydraulic pressure, but it is well realized that successful practice of this invention is not dependent upon the particular type of pump employed. Connected to the outlet of pump 170 is a four way valve 174 having an operating or control handle 174a for applying fluid pressure to conduits 176 and 178.

As shown most clearly in FIGURE 4 of the drawings, there is provided within curing stand 14 two fluid circuits, one of which is identified with numeral 180 and interconnects conduit 178 and the fitting-mounting members 52c of each of the three hydraulic jacks 50. Immediately adjacent circuit 180, as viewed in FIGURE 4, is a second circuit 184 which is connected at one end to conduit 176 and at its other end to conduits 186 which are connected to the respective hydraulic pumps 50 at the upper fittings 188 thereof.

As a result of this arrangement, an operator of the subject curing apparatus can position the control handle 174a of valve 174 so as to cause hydraulic pressure to raise or lower the upper matrix assembly 34. That is, in order to remove the upper matrix assembly 34 following completion of the curing operation, it is merely necessary to loosen all of the fastening devices and then position control handle 174a such as to apply fluid pressure to the bottom of the hydraulic jack 50.

In the operation of the aforedescribed apparatus, the first step is to remove the upper platen 22 and the fastening center post 70. To accomplish this, it is merely necessary to loosen nut 72 on center post 70 so as to permit retraction of lever 84a of locking mechanism 84 so as to remove the two halves 82a and 82b of lock ring 82 from within the annular groove 70a of the lower end portion of center post 70. After this has been accomplished, it is a simple matter to insert the hook of a crane or hoist in the "eye" 70d of the upper end of center post 70 and to exert an upward force on said shaft.

Upon upward lifting of center post 70, a point is reached where the annular shoulder 70c of the latter engages hub member 64 so that further upward travel of center post 70 carries with it the entire upper platen assembly. It has been found most convenient to provide a stand or rack (not shown) for storage of the upper platen assembly until the mold is to be closed again.

After the upper plate has been removed, the next step is to loosen all of the swing bolts 42 and position them as shown in FIGURE 2. It is then a simple matter for the operator to position control handle 174a of valve 174 such as to apply hydraulic pressure to the underside of piston 50d of each of the hydraulic jacks 50. This, of course, causes shaft 50c of each jack to be forced upwardly against bracket 54, the latter, of course, being fixed to the upper matrix assembly 34. In this manner, the upper matrix is "broken" away from the lower matrix assembly 24 and is lifted a predetermined distance therefrom as determined by the dimensional parameters of the hydraulic jacks.

Following this the L-shaped retainers 56 are withdrawn from slots 54c for release of each sphere 50h from within its respective mounting bracket 54 to enable a hoist 179 or crane to lift the upper matrix assembly 34 from the remainder of the curing apparatus, as shown in FIGURE 2. This, of course, permits the tire therewithin to be removed by hoist 179 to be replaced by another tire to be cured.

To close the mold, it is merely necessary to reverse the above explained operation by first lowering the upper matrix assembly 34 to a position wherein the various brackets 54 are fitted over the spherical end portions 50h of shaft 50c. This operation is greatly facilitated by the prominent bevel or chamfer 54d provided along the lower edge of each bracket portion 54b which guides the sphere or ball 50h into the socket 54a of bracket 54.

The next step, of course, is to position each of the retainers 56 as shown in FIGURE 3 of the drawings and to secure them in place by means of nuts 60 and studs 58. After this has been performed, it is necessary to suitably position control handle 174a of valve 174 so as to apply hydraulic pressure to the upper surface of piston member 50d. At the same time, such positioning of handle 174a effectively exhausts the conduits leading to the underside of such pistons. In this manner, the upper matrix assembly 34 is pulled into proper mating engagement with lower matrix assembly 24 at such a rate of speed as to prevent damage to the various parts as they come together. It is then a simple matter to position all of the swing bolts 42, as shown in FIGURE 1, and to tighten the same to firmly secure the matrices together.

The upper platen assembly can then be returned to its proper position by lowering of the center post 70 such that the lower end portion thereof is inserted through the opening in hub 68. By pushing lever 84a, the two halves of the split ring 82 are inserted within the annular groove 70a of center post 70 to thereafter prevent upward movement thereof. Nut 72 is then tightened against hub member 64 to further secure the various parts in their assembled positions.

Referring now to FIGURES 11 through 15, there is shown a second form of tire curing apparatus embodying the present invention. This second form of apparatus is generally similar to the form shown in FIGURES 1 through 10 with the exception that the stand 214 of the second form of the invention is reduced in diameter as compared to stand 14 of the first form, and the upper and lower platens, as well as the center post 70 and its attached parts have been eliminated in the second form. Like parts in the second form of the invention bear primed reference numerals.

Figure 14:
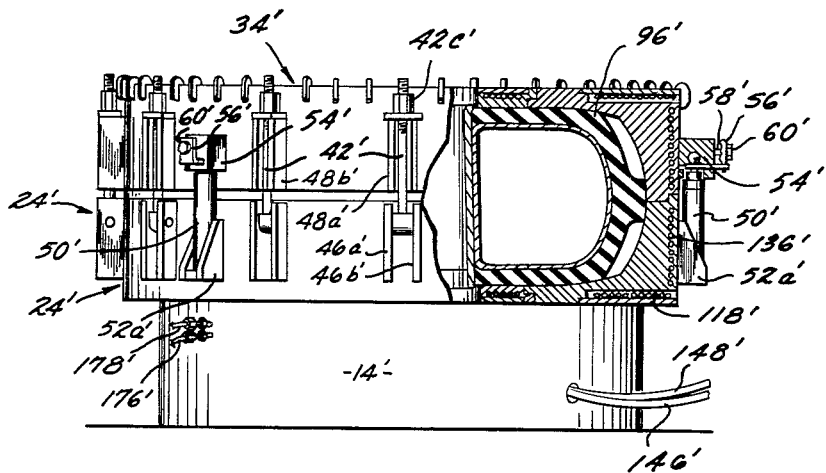
FIGURE 14 is a side elevational view similar to FIGURE 12 showing said second form of apparatus during a curing operation.

In the operation of the second form of apparatus and referring particularly to FIGURE 11, a tire 96' to be retreaded is first lowered by means of a hoist 179' into the lower matrix 32'. Referring to FIGURE 12, the upper matrix 34' is then lowered towards the lower matrix 32' by means of the hoist 179'. It is important to note that the upper matrix 34' is guided onto the spheres 50h' by means of the bevel or chamfer 54d' provided along the lower edge of each bracket portion 54b' as indicated particularly in FIGURE 13, the sliding engagement of the spheres 50h' with the bevel or chamfer 54d' directing the latter into the confines of the sockets 54a'. With the spheres 50h' seated within the sockets 54a' the L-shaped retainers 56' are secured in place. Thereafter, the hydraulic jack units 50' are actuated to move the upper matrix 34' downwardly. As the upper matrix assembly is moved downwardly into engagement with the lower matrix assembly the jack units 50' serve to positively register the two matrices. The swing bolts 42' are then pivoted upwardly and the nuts 42c' tightened. Steam is admitted within the copper tubing 118' and 136' whereby the curing operation may take place. The apparatus at this time appears as shown in FIGURE 14.

At the conclusion of the curing operation, the retainers 56 are withdrawn laterally from the mounting brackets 54'. Thereafter, pressurized fluid is admitted to the hydraulic jacks 50' whereby the shafts 50c' are urged upwardly.

It is important to note that many tire tread designs utilize complex curved ribs defined by similarly curved grooves on the matrices so as to make it difficult to effect release of the tread material from the matrix grooves after a curing operation. Also the adhesion qualities of the tread material is lowest just after a curing operation. Accordingly, the tread material at this time has the least tendency to remain adhered to the tire casing. It is necessary, however, to remove the retreaded tire while the temperature within the matrices is high in order that another tire may be retreaded at once. Additionally, the exposure of the tread material to elevated temperatures over too long a period of time will cause such tread material to "overcure," i.e. lose its elasticity.

Figure 15:
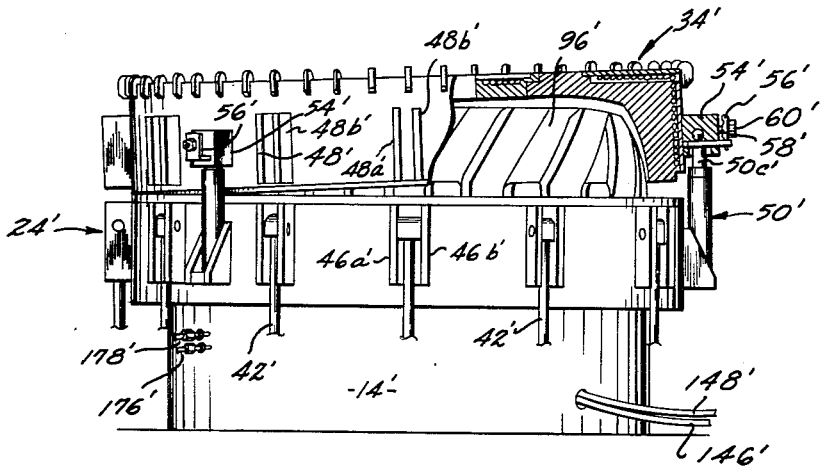
FIGURE 15 is a view generally similar to FIGURES 12 and 14 showing the upper matrix being urged upwardly away from the lower matrix at the conclusion of a tire curing operation.

Referring now to FIGURE 15, and with the foregoing in mind, when the tire 96' is released from the upper matrix 34' such release will initially occur at a single "breakaway" point on the circumference of the upper matrix. This is true since the retread material on the exterior of the tire will peal away from the matrix at that portion of the circumference thereof where the resistance is least, the magnitude of such resistance being determined by various factors including the temperature of the matrix and the adjacent tread material.

With apparatus embodying the present invention, the upward force exerted by each of the three hydraulic jacks 50' can be made substantially identical whereby the upper matrix 34' is free to move upwardly at any given point on its circumference. The hydraulic jack nearest the portion of the tire at which the tread material initially breaks away from the upper matrix 34' will then first undergo upward movement and effect concurrent movement of the upper matrix. In FIGURE 15 the hydraulic jack 50' disposed at the right-hand side of this figure has first undergone upward movement so as to effect concurrent upward movement of the right-hand side of the upper matrix 34'. Such upward movement of the right-hand side of the upper matrix permits the tire tread material at the left-hand side of the upper matrix to be rolled free of the upper matrix grooves on that side rather than being subjected to a direct upward pull, as would be the case if all three of the hydraulic jacks 50' were to move upwardly at the same rate of speed. In this manner the tread material is released from the upper matrix with minimum danger of damaging such tread material. After the tread material has been released at the left-hand portion of the upper matrix the latter will be urged upwardly to its uppermost position by the hydraulic jacks 50'. Of course, if desired the jacks 50' can be arranged to move upwardly simultaneously at the same rate of speed.

It should be particularly noted that the universal tilting connection between the upper end of the hydraulic jack shafts 50c' and the mounting brackets 54' relative to the upper end of the shafts 50c' eliminates binding of the shafts relative to their respective cylinders 50a' as would occur if the upper matrix could not pivot relative to the upper end of the shafts.

After the upper matrix assembly 34' has been moved upwardly to the extent of the vertical travel of the shafts 50c' the upper matrix 34' will be removed by the hoist 179'. Thereafter, the retreaded tire 98' will be removed in a similar fashion. The upper matrix assembly 34' is provided with lifting eyes 181 engageable by a sling 183 suspended from hoist 179'.

It should be particularly noted that the hydraulic jacks 50' and their connection with the mounting brackets 54' maintain the upper and lower matrices 32' and 34' registered as they close. Additionally, the hydraulic jacks 50' serve to draw the upper matrix 34' downwardly into a molding position without requiring any mechanical means whatever. The swing bolts 42' merely serve to lock the matrix halves together during the curing cycle. Once the swing bolts 42' have been engaged with the upper matrix 34' the hydraulic jacks need no longer be actuated. It should also be noted that a single pump 170' may be interchangeably utilized to operate several of the molding devices. The use of the independent matrices eliminates the need of the heavy, expensive, and cumbersome molds and the power-operated means for opening and closing such molds common in the prior art. Accordingly, the initial capital investment as well as the cost of maintenance of the apparatus will be less than with prior art molding devices of this nature.

Various modifications and changes may be made with respect to the foregoing detailed description without departing from the spirit of the invention or the scope of the following claims.

I claim:
1. Tire curing apparatus, comprising:
   a lower matrix formed with a cavity that receives the lower part of a tire to be cured, said matrix having heat generating means surrounding said cavity;
   a coaxial upper matrix formed with a cavity that receives the upper part of a tire to be cured, said upper matrix having heat generating means surrounding said cavity, and said upper matrix being vertically removable from said lower matrix for admitting and discharging a tire to be cured;
   quick-releasable securing means interposed directly between said matrices that when engaged retain said matrices secured against relative vertical movement, said upper matrix being removable from said lower matrix when said securing means are disengaged;
   a plurality of at least three vertically extending fluid pressure-actuated jack means, each having a cylinder rigidly secured to said lower matrix and a vertical shaft reciprocally extending from the upper end of said cylinder;
   universal joint connection means interposed between the upper portion of each of said shafts and said upper matrix that permit universal pivoting of said upper matrix relative to said shafts but restrain lateral movement of said upper matrix relative to said shafts;
   quick-releasable lock means operatively associated with said connection means, said lock means when disengaged permitting said upper matrix to be removed from said shafts and said lock means when engaged cooperating with said connection means to secure said shafts to said upper matrix whereby said shafts effect vertical movement of said upper matrix; and
   control means for said jack means operable to urge said shafts downwardly and thereby draw said matrices together while maintaining said matrices registered whereby said securing means may be engaged prior to a curing operation, said control means also being operable after said curing operation to urge said shafts upwardly and thereby lift said upper matrix free of said tire and said lower matrix.

2. Tire curing apparatus, comprising:
   a lower matrix formed with a cavity that receives the lower part of a tire to be cured, said matrix having heat generating means surrounding said cavity;
   a coaxial upper matrix formed with a cavity that receives the upper part of a tire to be cured, said upper matrix having heat generating means surrounding said cavity, and said upper matrix being vertically removable from said lower matrix for admitting and discharging a tire to be cured;
   quick-releasable securing means interposed directly between said matrices that when engaged retain said matrices secured against relative vertical movement, said upper matrix being removable from said lower matrix when said securing means are disengaged;

a plurality of at least three vertically extending fluid pressure-actuated jack means, each having a cylinder secured directly and rigidly to said lower matrix and a vertical shaft reciprocally extending from the upper end of said cylinder;

a sphere formed at the upper end of each of said shafts;

a plurality of mounting brackets on said upper matrix, each formed with a socket that receives one of said spheres to provide a universal joint connection means between the upper portion of each of said shafts and said upper matrix that permit universal pivoting of said upper matrix relative to said shafts but restrain lateral movement of said upper matrix relative to said shafts;

quick-releasable lock means operatively associated with said mounting brackets and spheres, said lock means when disengaged permitting said upper matrix to be removed from said shafts and said lock means when engaged cooperating with said mounting brackets and spheres to secure said shafts to said upper matrix whereby said shafts effect vertical movement of said upper matrix; and control means for said jack means operable to urge said shafts downwardly and thereby draw said matrices together while maintaining said matrices registered whereby said securing means may be engaged prior to a curing operation, said control means also being operable after said curing operation to urge said shafts upwardly and thereby lift said upper matrix free of said tire and said lower matrix.

3. Tire curing apparatus for use with a hoist, comprising:

a lower matrix formed with a cavity that receives the lower part of a tire to be cured, said matrix having heat generating means surrounding said cavity;

a coaxial upper matrix formed with a cavity that receives the upper part of a tire to be cured, said upper matrix having heat generating means surrounding said cavity, and said upper matrix being vertically removable from said lower matrix for admitting and discharging a tire to be cured;

quick-releasable securing means interposed directly between said matrices that when engaged retain said matrices secured against relative vertical movement, said upper matrix being removable from said lower matrix when said securing means are disengaged;

a plurality of at least three vertically extending fluid pressure-actuated jack means, each having a cylinder secured directly and rigidly to said lower matrix and a vertical shaft reciprocally extending from the upper end of said cylinder;

a sphere formed at the upper end of each of said shafts;

a plurality of mounting brackets on said upper matrix, each formed with a socket that receives one of said spheres to provide a universal joint connection means between the upper portion of each of said shafts and said upper matrix that permit universal pivoting of said upper matrix relative to said shafts but restrain lateral movement of said upper matrix relative to said shafts;

means on said upper matrix engageable with said hoist whereby said upper matrix may be vertically removed from said shafts;

quick-releasable lock means operatively associated with said mounting bracket and spheres, said lock means when disengaged permitting said upper matrix to be removed from said shafts and said lock means when engaged cooperating with said connection means to secure said shafts to said upper matrix whereby said shafts effect vertical movement of said upper matrix; and control means for said jack means operable to urge said shafts downwardly and thereby draw said matrices together while maintaining said matrices registered whereby said securing means may be engaged prior to a curing operation, said control means also being operable after said curing operation to urge said shafts upwardly and thereby lift said upper matrix free of said tire and said lower matrix.

4. Tire curing apparatus, comprising:

a lower matrix formed with a cavity that receives the lower part of a tire to be cured, said matrix having heat generating means surrounding said cavity;

a coaxial upper matrix formed with a cavity that receives the upper part of a tire to be cured, said upper matrix having heat generating means surrounding said cavity, and said upper matrix being vertically removable from said lower matrix for admitting and discharging a tire to be cured;

quick-releasable securing means interposed directly between said matrices that when engaged retain said matrices scured against relative vertical movement, said upper matrix being removable from said lower matrix when said securing means are disengaged;

a plurality of vertically extending fluid pressure-actuated jack means, each having a cylinder secured directly and rigidly to said lower matrix and a vertical shaft reciprocally extending from the upper end of said cylinder;

a sphere formed at the upper end of each of said shafts;

a plurality of mounting brackets on said upper matrix, each formed with a socket that receives one of said spheres to provide a universal joint connection means between the upper portion of each of said shafts and said upper matrix that permit universal pivoting of said upper matrix relative to said shafts but restrain lateral movement of said upper matrix relative to said shafts, each said mounting bracket being formed with a beveled surface below said socket engageable with one of said spheres to guide the latter into said socket as said upper matrix is lowered onto said lower matrix;

quick-releasable lock means operatively associated with said mounting bracket and spheres, said lock means when disengaged permitting said upper matrix to be removed from said shafts and said lock means when engaged cooperating with said connection means to secure said shafts to said upper matrix whereby said shafts effect vertical movement of said upper matrix; and control means for said jack means operable to urge said shafts downwardly and thereby draw said matrices together while maintaining said matrices registered whereby said securing means may be engaged prior to a curing operation, said control means also being operable after said curing operation to urge said shafts upwardly and thereby lift said upper matrix free of said tire and said lower matrix.

5. Tire curing apparatus for use with a hoist comprising:

a lower matrix formed with a cavity that receives the lower part of a tire to be cured, said matrix having heat generating means surrounding said cavity;

a coaxial upper matrix formed with a cavity that receives the upper part of a tire to be cured, said upper matrix having heat generating means surrounding said cavity, and said upper matrix being vertically removable from said lower matrix for admitting and discharging a tire to be cured;

quick-releasable securing means interposed directly between said matrices that when engaged retain said matrices secured against relative vertical movement, said upper matrix being removable from said lower matrix when said securing means are disengaged;

at least three vertically extending fluid pressure actuated jack means, each having a cylinder secured directly and rigidly to said lower matrix and a vertical shaft reciprocally extending from the upper end of said cylinder;

a sphere formed at the upper end of each of said shafts;

a plurality of mounting brackets on said upper matrix, each formed with a socket that receives one of said spheres to provide a universal joint connection means between the upper portion of each of said shafts and said upper matrix that permit universal pivoting of said upper matrix relative to said shafts but restrain lateral movement of said upper matrix relative to said shafts, each said mounting bracket being formed with a beveled surface below said socket engageable with one of said spheres to guide the latter into said socket as said upper matrix is lowered onto said lower matrix;

means on said upper matrix engageable with said hoist whereby said upper matrix may be vertically removed from said shafts;

quick-releasable lock means operatively associated with said mounting bracket and spheres, said lock means when disengaged permitting said upper matrix to be removed from said shafts and said lock means when engaged cooperating with said connection means to secure said shafts to said upper matrix whereby said shafts effect vertical movement of said upper matrix; and control means for said jack means operable to urge said shafts downwardly and thereby draw said matrices together while maintaining said matrices registered whereby said securing means may be engaged prior to a curing operation, said control means also being operable after said curing operation to urge said shafts upwardly and thereby lift said upper matrix free of said tire and said lower matrix.

6. Tire curing apparatus, comprising:

a stand;

a lower matrix on said stand and formed with a cavity that receives the lower part of a tire to be cured, said matrix having heat generating means surrounding said cavity;

a coaxial upper matrix formed with a cavity that receives the upper part of a tire to be cured, said matrix having heat generating means surrounding said cavity;

a platen that rests upon the upper surface of said upper matrix and is centrally formed with a hub;

a vertical center post that extends upwardly from said stand through said hub, the upper portion of said center post being threaded;

means operatively interposed between the lower portion of said center post and said stand to selectively lock said center post against vertical movement relative to said stand during a tire curing operation;

a nut member engaged with the upper portion of said center post that is tightened to apply downward force against said lower matrix during a tire curing operation;

a plurality of bolts having their lower ends directly attached to said lower matrix for pivotal movement radially of said matrix, the upper ends of said bolts being threaded;

abutment means formed on said upper matrix to receive the upper portion of said bolts;

nut means engageable with the upper portions of said bolts that engage said abutment means to retain said upper matrix against upward movement away from said lower matrix during a tire curing operation;

at least three vertically extending fluid pressure-actuated jack means secured directly and rigidly at the lower end thereof to said lower matrix;

selectively engageable means on said upper matrix that releasably secures said jack means directly to said upper matrix; and control means for said jack means operable to draw said matrices together prior to a curing operation whereby said nut means may be engaged with said abutment means and said nut member may be tightened no said center post, said control means also being operable after said curing operation to urge said matrices vertically apart, with said jack means providing all of the force necessary to effect such vertical movement of said matrices.

7. Tire curing apparatus, comprising:

a stand;

a lower matrix on said stand and formed with a cavity that receives the lower part of a tire to be cured, said matrix having heat generating means surrounding said cavity;

a coaxial upper matrix formed with a cavity that receives the upper part of a tire to be cured, said matrix having heat generating means surrounding said cavity;

a platen that rests upon the upper surface of said upper matrix and is centrally formed with a hub;

a vertical center post that extends upwardly from said stand through said hub, the upper portion of said center post being threaded;

means operatively interposed between the lower portion of said center post and said stand to selectively lock said center post against vertical movement relative to said stand during a tire curing operation;

a nut member engaged with the upper portion of said center post that is tightened to apply downward force against said lower matrix during a tire curing operation;

a plurality of bolts having their lower ends directly attached to said lower matrix for pivotal movement radially of said matrix, the upper ends of said bolts being threaded;

abutment means formed on said upper matrix to receive the upper portion of said bolts;

nut means engageable with the upper portions of said bolts that engage said abutment means to retain said upper matrix against upward movement away from said lower matrix during a tire curing operation;

at least three vertically extending fluid pressure-actuated jack means having a cylinder secured directly and rigidly to said lower matrix and a vertical shaft reciprocally extending from the upper end of said cylinder, the upper end of said shaft being a spheroid;

spherical socket means on said upper matrix that removably receive said spheroid;

lock means operatively associated with said socket means to engage said spheroid and retain it within said socket means while permitting relative pivotal movement therebetween;

and control means for said jack means operable to draw said matrices together prior to a curing operation whereby said nut means may be engaged with said abutment means and said nut member may be tightened on said center post, said control means also being operable after said curing operation to urge said matrices vertically apart, with said jack means providing all of the force necessary to effect such vertical movement of said matrices.

8. Tire curing apparatus, comprising:

a lower matrix formed with a cavity that receives the lower part of a tire to be cured, said matrix having heat generating means surrounding said cavity;

a coaxial upper matrix formed with a cavity that receives the upper part of a tire to be cured, said upper matrix having heat generating means surrounding said cavity, and said upper matrix being vertically removable from said lower matrix for admitting and discharging a tire to be cured;

quick-releasable securing means interposed directly between said matrices that when engaged retain said matrices secured against relative vertical movement, said upper matrix being removable from said lower matrix when said means are disengaged;

at least three vertically extending fluid pressure-actuated jack means interposed between said matrices, each having a cylinder secured directly and rigidly to one of said matrices and a vertical shaft reciprocally extending from the end of said cylinder opposite its point of secural to said one of said matrices;

universal joint connection means interposed between the free end of each of said shafts and the other of said matrices that permit universal pivoting of the other of said matrices relative to said shafts but restrain lateral movement of the other of said matrices relative to said shafts;

quick-releasable lock means operatively associated with said connection means, said lock means when disengaged permitting the other of said matrices to be removed from said shafts and said lock means when engaged cooperating with said connection means to secure said shafts to the other of said matrices whereby said shafts effect vertical movement of the other of said matrices; and control means for said jack means operable to urge said shafts vertically and thereby draw said matrices together while maintaining said matrices registered whereby said securing means may be engaged prior to a curing operation, said control means also being operable after said curing operation to urge said shafts vertically and thereby lift said upper matrix free of said tire and said lower matrix, said upper matrix automatically releasing from said tire at the point on the circumference of said upper matrix where the magnitude of resistance of said tire to separation from said upper matrix is least.

9. Tire curing apparatus, comprising:

a lower matrix formed with a cavity that receives the lower part of a tire to be cured, said matrix having heat generating means surrounding said cavity;

a coaxial upper matrix formed with a cavity that receives the upper part of a tire to be cured, said upper matrix having heat generating means surrounding said cavity, and said upper matrix being vertically removable from said lower matrix for admitting and discharging a tire to be cured;

quick-releasable securing means interposed directly between said matrices that when engaged retain said matrices secured against relative vertical movement, said upper matrix being removable from said lower matrix when said means are disengaged;

at least three vertically extending fluid pressure-actuated jack means interposed between said matrices, each having a cylinder secured directly and rigidly to one of said matrices and a vertical shaft reciprocally extending from the end of said cylinder opposite its point of secural to said one of said matrices;

a sphere formed on the free end of each of said shafts;

socket means formed on the other of said matrices that receive said spheres to provide connection means that permit universal pivoting of the other of said matrices relative to said shafts but restrain lateral movement of the other of said matrices relative to said shafts;

quick-releasable lock means interposed between said shafts and the other of said matrices, said lock means when disengaged permitting the other of said matrices to be removed from said shafts and said lock means when engaged cooperating with said connection means to secure said shafts to the other of said matrices whereby said shafts effect vertical movement of the other of said matrices; and control means for said jack means operable to urge said shafts vertically and thereby draw said matrices together while maintaining said matrices registered whereby said securing means may be engaged prior to a curing operation, said control means also being operable after said curing operation to urge said shafts vertically and thereby lift said upper matrix free of said tire and said lower matrix, said upper matrix automatically releasing from said tire at the point on the circumference of said upper matrix where the magnitude of resistance of said tire to separation from said upper matrix is least.

10. Tire curing apparatus for use with a hoist and characterized by the lack of the usual mold sections, comprising:

a self-contained lower matrix formed with a cavity that receives the lower part of a tire to be cured, said matrix having heat generating means surrounding said cavity;

a coaxial self-contained upper matrix formed with a cavity that receives the upper part of a tire to be cured, said upper matrix having heat generating means surrounding said cavity, and said upper matrix being vertically removable from said lower matrix by means of said hoist for admitting and discharging a tire to be cured;

quick-releasable securing means interposed directly between said matrices that when engaged retain said matrices secured against relative vertical movement, said upper matrix being movable upwardly away from said lower matrix when said securing means are disengaged;

at least three vertically extending fluid pressure-actuated jack means, each having a cylinder secured directly and rigidly to said lower matrix and a vertical shaft reciprocally extending from the upper end of said cylinder;

means on said upper matrix engageable with said hoist;

quick-releasable lock means operatively interposed between the upper end of said shafts and said upper matrix, said lock means when disengaged permitting said upper matrix to be completely removed from said lock means when engaged securing the upper said shafts and said lower matrix by said hoist and end of said shaft to said upper matrix whereby said shafts effect vertical movement of said upper matrix while restraining said upper matrix against horizontal movement;

and control means for said jack means operable to urge said shafts downwardly and thereby draw said matrices together while maintaining said matrices registered whereby said securing means may be engaged prior to a curing operation, said control means also being operable after said curing operation to urge said shafts upwardly and thereby lift said upper matrix free of said tire and said lower matrix.

References Cited in the file of this patent

UNITED STATES PATENTS

| 2,184,119 | Glynn | Dec. 19, 1939 |
| 2,231,254 | Cleveland | Feb. 11, 1941 |
| 2,266,720 | Chambers | Dec. 16, 1941 |
| 2,375,784 | Glynn | May 15, 1945 |
| 2,736,060 | Glynn | Feb. 28, 1956 |
| 2,745,137 | Glynn | May 15, 1956 |

UNITED STATES PATENT OFFICE
CERTIFICATE OF CORRECTION

Patent No. 3,154,814                          November 3, 1964

Louis T. Fike

It is hereby certified that error appears in the above numbered patent requiring correction and that the said Letters Patent should read as corrected below.

Column 16, lines 45 and 46, strike out "said lock means when engaged securing the upper said shafts and said lower matrix by said hoist and" and insert instead -- said shafts and said lower matrix by said hoist and said lock means when engaged securing the upper --.

Signed and sealed this 30th day of March 1965.

(SEAL)
Attest:

ERNEST W. SWIDER
Attesting Officer

EDWARD J. BRENNER
Commissioner of Patents